(12) United States Patent
Lloyd et al.

(10) Patent No.: US 11,023,363 B2
(45) Date of Patent: *Jun. 1, 2021

(54) PERFORMANCE TEST APPLICATION SEQUENCE SCRIPT

(71) Applicant: Spirent Communications, Inc., San Jose, CA (US)

(72) Inventors: Rupert Lloyd, Reston, VA (US); Ian Becker, Sunnyvale, CA (US); Ardeshir Ghanbarzadeh, Sunnyvale, CA (US); Ivo Tadic, Sunnyvale, CA (US); Yuanke Wang, Sunnyvale, CA (US)

(73) Assignee: Spirent Communications, Inc., San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/456,331

(22) Filed: Mar. 10, 2017

(65) Prior Publication Data

US 2017/0262130 A1 Sep. 14, 2017

Related U.S. Application Data

(60) Provisional application No. 62/307,388, filed on Mar. 11, 2016.

(51) Int. Cl.
*G06F 11/36* (2006.01)

(52) U.S. Cl.
CPC ...... *G06F 11/3688* (2013.01); *G06F 11/3684* (2013.01)

(58) Field of Classification Search
CPC .......................... G06F 11/3688; G06F 11/3684
USPC ........................................................ 717/124
See application file for complete search history.

(56) References Cited

U.S. PATENT DOCUMENTS

| 6,502,102 B1 * | 12/2002 | Haswell | G06F 11/3664 |
| 6,907,546 B1 * | 6/2005 | Haswell | G06F 11/3684 |
| | | | 714/38.11 |
| 8,436,829 B1 * | 5/2013 | Zhai | G06F 3/0418 |
| | | | 345/156 |

(Continued)

OTHER PUBLICATIONS

"Kobayashi et al";"Android debug Bridge: how it work?";"2012";"36 pages".*

(Continued)

*Primary Examiner* — Wei Y Zhen
*Assistant Examiner* — Brahim Bourzik
(74) *Attorney, Agent, or Firm* — Haynes Beffel & Wolfeld, LLP; Ernest J. Beffel, Jr.

(57) ABSTRACT

Systems, methods, and devices for creating test and testing a plurality of touchscreen devices are described. The methods comprise creating a test script by recording the touch events performed on a touchscreen device by a technician. The method of recording touch events for later use as a test script is faster and requires less programming knowledge, compared to manually writing a test script. This is beneficial if a new test script is needed quickly because a technician can perform a desired touch sequence on a device recording the sequence and then distribute the recorded sequence to be played on a plurality of devices to be tested. The recorded sequence may include a plurality of sequential touch events. Additionally, the recorded sequence may include conditional statements used to determining the timing of simulating one of the touch events in the sequence.

16 Claims, 7 Drawing Sheets

(56) References Cited

U.S. PATENT DOCUMENTS

| | | | |
|---|---|---|---|
| 8,650,489 | B1 | 2/2014 | Baum et al. |
| 8,732,529 | B2 * | 5/2014 | Park .................... G06F 11/3672 714/38.1 |
| 9,811,352 | B1 * | 11/2017 | Sharifi ................. G06F 16/156 |
| 9,990,110 | B1 * | 6/2018 | Lounibos ............... G06F 3/0484 |
| 2003/0037289 | A1 | 2/2003 | Singh et al. |
| 2005/0086557 | A1 | 4/2005 | Sato et al. |
| 2011/0251819 | A1 | 10/2011 | Ong |
| 2013/0287305 | A1 | 10/2013 | Dhanda et al. |
| 2014/0045483 | A1 * | 2/2014 | Whidden ................ H04M 1/24 455/420 |
| 2014/0132571 | A1 | 5/2014 | Zeng et al. |
| 2015/0161386 | A1 | 6/2015 | Gupta et al. |
| 2015/0207676 | A1 | 7/2015 | Kuokkanen et al. |
| 2015/0327022 | A1 | 11/2015 | Lin et al. |
| 2015/0339213 | A1 * | 11/2015 | Lee ........................ G06F 3/0484 717/125 |
| 2015/0370680 | A1 * | 12/2015 | Chiang ................... G06F 3/023 717/126 |
| 2016/0028845 | A1 | 1/2016 | Barr et al. |
| 2017/0031808 | A1 * | 2/2017 | Gillaspie ............. G06F 11/3692 |
| 2017/0180238 | A1 * | 6/2017 | Telle ................... G06F 11/3058 |
| 2018/0084047 | A1 | 3/2018 | Hao et al. |
| 2018/0089071 | A1 | 3/2018 | Keskitalo et al. |
| 2018/0246626 | A1 | 8/2018 | Lounibos et al. |
| 2018/0300225 | A1 * | 10/2018 | Topholt ............... G06F 11/3664 |
| 2018/0343574 | A1 | 11/2018 | Basedahl et al. |
| 2018/0358313 | A1 | 12/2018 | Newman et al. |
| 2018/0365133 | A1 | 12/2018 | Mitchell et al. |
| 2019/0206390 | A1 | 7/2019 | Rotem et al. |
| 2019/0227917 | A1 * | 7/2019 | Henry ................ G06F 11/3684 |

OTHER PUBLICATIONS

Gomez et al;RERAN: Timing- and Touch-Sensitive Record and Replay for Android; 10 pages (Year: 2013).*

Android Debug Bridge, Android Developers Testing Support Library, 11 pages, accessed Mar. 2, 2016 [http://developer.android.com/tools/help/adb.html[Feb. 2, 2016=5:17:15 PM].

MonkeyDevice, Android Developers Testing Support Library. 6 pages, accessed Mar. 2, 2016 [http://developer.android.com/tools/help/MonkeyDevice.html[Feb. 2, 2016 5:46:04 PM] ].

Testing Concepts, Android Developers Testing Support Library. 7 pages, accessed Mar. 2, 2016 [http://developer.android.com/tools/testing/testing_android.html[Feb. 2, 2016 6:00:39 PM] ].

Testing Support Library, Android Developers Testing Support Library. 9 pages, accessed Mar. 2, 2016 [http://developer.android.com/tools/testing-support-library/index.html[Feb. 2, 2016 6:26:15 PM] ].

Android Developers, ADB Shell Commands,12 pages, accessed Nov. 11, 2015 (http://developer.android.com/tools/help/shell.html#shellcommands).

Android Developers, Android Interprocess Communication (IPC) with Messenger (Remote Bound Services) | Code Theory, 6 pages, accessed Nov. 11, 2015 (http://codetheory.in/android-interprocess-communication-ipc-messenger-remote-bound-services/).

Android Developers, Monkeyrunner, 7 pages, accessed Nov. 11, 2015 at (http://developer.android.com/tools/help/monkeyrunner concepts.html).

Android Developers, Using DDMS, 7 pages, accessed Nov. 11, 2015 at (http://developer.android.com/tools/debugging/ddms.html).

Remote Input shell scripts for your Android Device, or my screen is cracked. 4 pages, accessed Nov. 11, 2015 at (https://grymoire.wordpress.com/2014/09/17/remote-input-shell-scripts-for-your-android-device/).

U.S. Appl. No. 15/875,982—Non-final Office Action dated Nov. 29, 2019, 23 pages.

U.S. Appl. No. 15/875,982—Response to Non-final Office Action dated Nov. 29, 2019, filed Apr. 29, 2020, 15 pages.

U.S. Appl. No. 15/875,982—Notice of Allowance dated Jul. 29, 2020, 11 pages.

U.S. Appl. No. 15/875,982, filed Jan. 19, 2018, US10,853,232, Dec. 1, 2020, Issued.

* cited by examiner

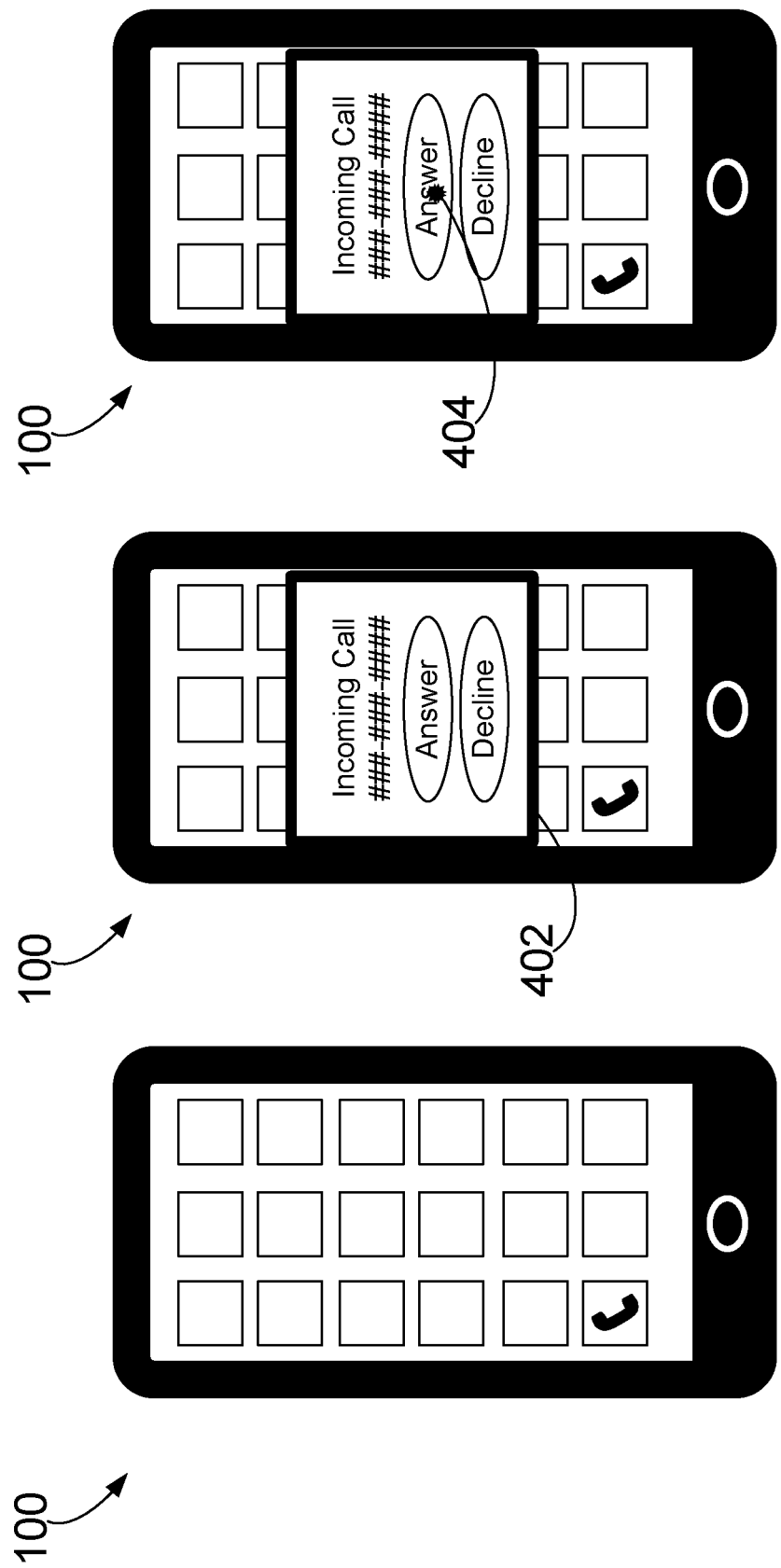

PERFORMANCE TEST APPLICATION SEQUENCE SCRIPT

CROSS-REFERENCE

This application claims priority to and the benefit of U.S. Provisional Application No. 62/307,388, titled "PERFORMANCE TEST APPLICATION SEQUENCE SCRIPT", filed Mar. 11, 2016. The priority application is incorporated by reference herein.

FIELD OF THE INVENTION

The present invention generally relates to systems, methods and devices for creating and running tests of touchscreen devices to evaluate various device performance parameters.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Touchscreen interfaces are quickly replacing physical button interfaces. For example, physical keyboards and physical telephone number pads are being replaced by virtual touchscreen keyboards and number pads. Unlike conventional physical button interfaces, for example keyboards, which have a fixed number of keys and a fixed layout, touchscreens can be continuously configured and reconfigured to have different layouts with the same or different keys. For example, a touchscreen may initially display a QWERTY keyboard layout and with a tap of a virtual button the touchscreen may be reconfigured to display a different keyboard layout with different functions for the keys.

SUMMARY

One field of industry that has quickly adopted touchscreen technology is the mobile device/telephone industry. Touchscreen mobile devices, such as smartphones, have become the standard form of mobile telephone device. Touchscreen mobile devices include software programs, sometime referred to as "apps", which frequently include support for tactile user interfaces that are controlled by touch, multi-touch (e.g., tap, pinch, etc.), and other gesture events. Many parties in the mobile telephone industry have a need to test mobile devices, for example; mobile device manufactures, wireless carriers, and mobile device application developers. Example tests may include testing the mobile devices in varying radio environments or under different processor loads. Test scripts are often device specific and a test script written for a non-touchscreen mobile device may not work on a touchscreen device. Therefore touchscreen devices need touchscreen specific test scripts.

Testing touchscreen devices may include test scripts which simulate user screen touch inputs, referred to herein as "touch events", on the touchscreen device. One way to create a test simulating touch events is to write a script including a sequence of touch events. This process involves manually inputting a location on the touchscreen and a timestamp for each touch event in the sequence. This process of writing the script is very time intensive and requires skill in programming. Further, different test scripts need to be written for different devices, for example due to different screen sizes, different versions of an operating system or application, or different arrangement of icons. Therefore, developing similar tests for a plurality of similar, but not identical devices, is very time intensive as each device requires a new test script to be written. Therefore, there is a need to simplify the process of creating a test script for a device so that it will be less time intensive for creating a single test script, as well as multiple similar test scripts for a plurality of different devices.

When replaying a test script including a sequence of touch events, the timing between sequential touch events must be precise in order to properly test the device in the desired way. For example, if a simulated touch is too early the device may not be ready to process the simulated touch because the intended virtual key to touch may not be displayed yet and the simulated touch may be processed to perform a different function than intended or perform no function at all. Similarly, if the simulated touch event is too late, the virtual key that the simulated touch event is intended to press may no longer be displayed due to a timeout period. Due to processes not always occurring with the same timing on a device due to various variables, sometimes the timing of the recorded touch sequence may not match the timing during the actual testing of devices and therefore the desired tasks and functions of the test may not be performed. Accordingly, there is a need to ensure that simulated touches in a touch event sequence are performed with correct timing for the desired function or task to be performed.

Further, performance testing of mobile devices is complicated by measures taken to reduce the mobile devices' vulnerability to hacking. Mobile devices are vulnerable to exploits because they often connect with unsecured public access points and typically support multiple wireless access protocols. Unlike wired desktop computers, a mobile device routinely communicates over multiple physical channels, without the person carrying the device being aware of the open channels.

Wireless devices and cell phones in particular compartmentalize vulnerability by strictly limiting communications between applications running on the device. Mobile device operating systems are intended to make it difficult or impossible for a malicious actor to invade or exploit other applications.

Development and debugging tools extend the allowable inter-process communications under limited circumstances. Mobile devices include at least one physical wired port that can be used to initiate debugging. Requiring a wired connection to initiate debugging is a design feature that reduces the vulnerability of mobile devices by adding physical security requirements to software implemented security. Debugging using the Android Debugging Bridge (ADB) takes this approach, as it presently requires a physical wired USB connection to initiate debugging mode. In debugging mode, a privileged application can communicate with a normal application by emulating inputs from and receiving outputs directed to the mobile device's operating system.

At opposing poles, development and debugging tools either incur a substantial performance penalty for debugger control of and access to program elements using a visual interface or require entry of low level commands via a command line interface. Android Debugging Bridge (ADB) takes the command line approach. Processing numerous low level commands through a command line interface to apps on the mobile device that are being tested cannot produce a practical test of mobile device performance.

The technology disclosed combines several technical elements: physical security at startup of debugging mode; a program installed on a mobile device that runs in debugging mode at a heightened privilege level; program components that record screen interactions and report them to a test controller; program components that play back screen interaction inputs responsive to directions from the test controller; program components that monitor performance of the mobile device and report performance to the test controller.

Advantageously, once physical security has been established and debugging mode started, a wireless link can be substituted for a wired link. Or, a wireless connection can continue (not presently available with ADB), if the physical security that protected debugging mode during a wireless startup involved physical user interaction with the mobile device, such as biometric authentication or entry of a password or other authentication and acceptance.

During playback of screen interaction inputs, the appearance of the mobile device screen (in whole or part) can be monitored to measure response times and to detect readiness for additional inputs. The desired screen appearance can be collected during recording of screen interactions. Alternatively, packet streams received by the mobile device can be monitored to measure responses and detect readiness, when the packet streams are accessible without waiting for rendering. The packet streams can be monitored during recording of screen interactions and, optionally, correlated automatically with changes in the screen appearance. Packet stream monitoring during a test potentially requires less resources than screen monitoring.

The present invention provides a system, method, and device for creating test and testing a plurality of touchscreen devices. In one embodiment the method comprises creating a test script by recording the touch events performed on a touchscreen device by a technician. This method of recording touch events for later use as a test script is faster and requires less programming knowledge, compared to manually writing out a test script for a device. This is beneficial if a new test script is needed quickly because rather than having to rewrite or edit a script file, a technician can quickly perform a desired touch sequence on a device recording the sequence and then distribute the recorded sequence to be played on a plurality of devices to be tested. The recorded sequence may include a plurality of sequential touch events. Additionally, the recorded sequence may include conditional statements used to determining the timing of simulating one of the touch events in the sequence.

The invention will be better understood by reference to the following detailed description taken in conjunction with the accompanying drawings

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIGS. 4A-C is a sequence of images illustrating a recorded and replayed sequence of touch events including a screen condition.

DETAILED DESCRIPTION OF ILLUSTRATIVE EXAMPLES

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As used herein, the term touchscreen device refers to any device using a touch sensor capable of detecting the coordinates of a touch on the sensor, such as a smartphone, a tablet, or an eBook.

Figure 1A:
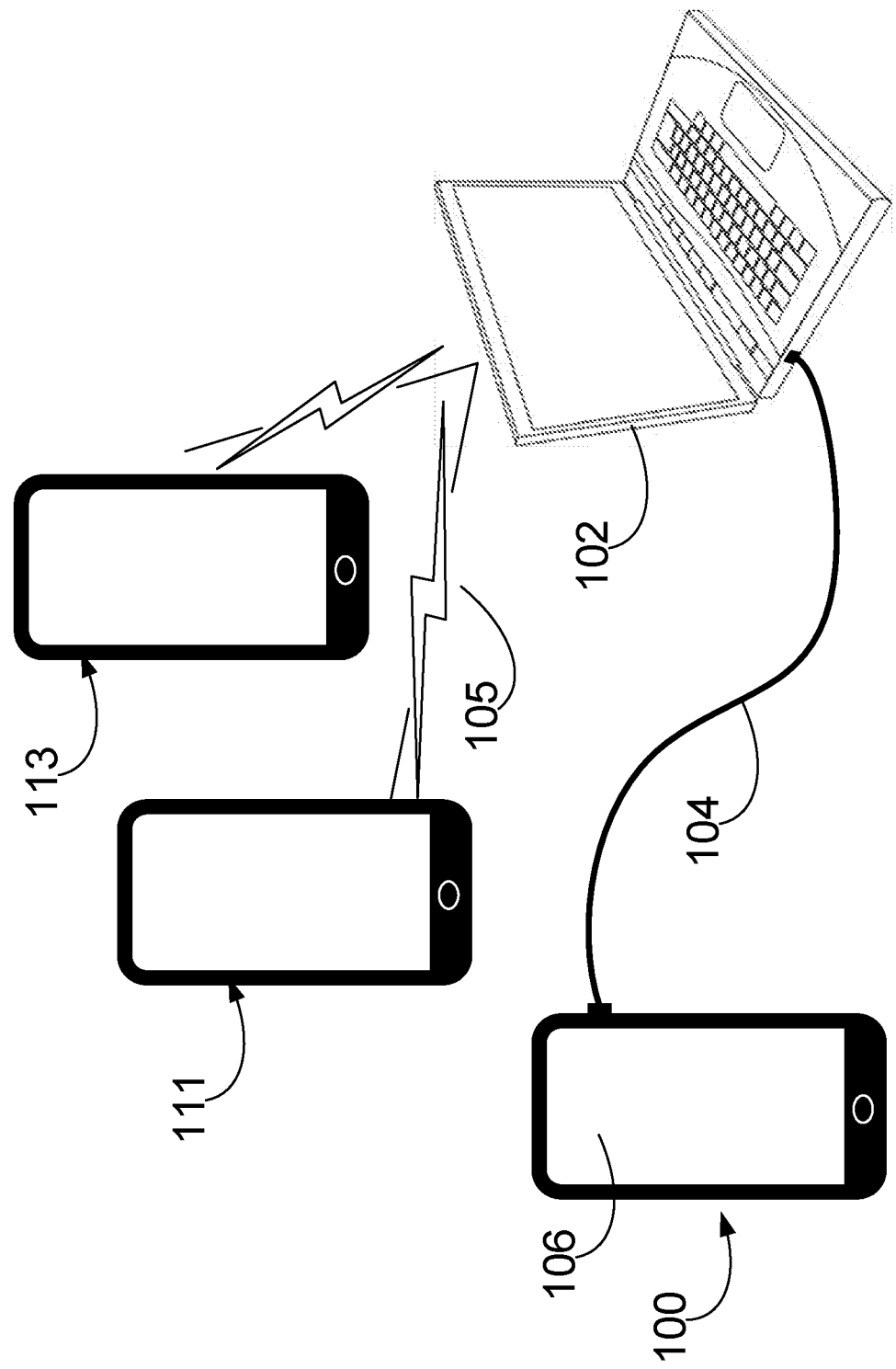
FIG. 1A is an illustration of mobile devices connected to a remote machine.

FIG. 1A shows a mobile device 100 connected to a remote machine 102, also referred to herein as a PC, with a USB connection 104. The mobile device 100 is a computer system including a touchscreen display 106, a processor, a memory, and a plurality I/O ports (e.g. USB, WiFi, headphone jack). The touchscreen display 106 is capable of detecting user touch input, for example touching the screen with a finger or a stylus. The user touch input may be processed as a tap, swipe, or gesture. The remote machine 102 is a computer system configured to run a command line tool, script processor or GUI that allows for communication with the mobile device through the USB connection 104 or through a wireless (WiFi, WiMax, DECT, Zigby, Bluetooth, etc.) connection 105. For example, the command line tool can be the Android Debug Bridge (ADB), and the mobile device runs the Android operating system.

Under normal operation, the Android operating system on the mobile device does not give a first application permissions to send or receive events, such as screen touch events, to a second applications, sometime referred to as inter-process communications. Instead, the system stack is ordinarily the source of all system events including screen touch events. Other mobile operating systems are similarly secured. However, with an ADB connection initiated through a USB connection, permissions are elevated to allow instructions or simulated system events to be communicated from a heightened permissions program (HPP) running on the mobile device to other programs also running on the mobile device. In one ADB configuration, a user at the PC invokes a client ADB command line tool on the PC. An ADB server host, also on the PC, establishes a connection to a daemon that runs as a background process on the mobile device. The user enters commands or runs a script representing primitive events to be emulated on the connected Android device. In another configuration, an Android class MonkeyRunner is used with related classes to write a program driven test. Example events that can be sent to the client are screen touch and screen drag events. In these configurations, the USB connection is a physical security requirement, a prerequisite to elevating permissions to allow extended inter-process communications. Further security may be provided by requiring matching keys on the PC and mobile device, which tie the mobile device to the PC from which the debug component was installed. Elevated permissions allow applications running on the device to send and receive events to or from other applications running on the device. The elevated permissions are necessary for a test application, for instance, to generate screen touch events for processing, as if a user were pressing on the mobile device's display.

With a command line tool, such as the ADB, or a program interface, permissions are available to allow a developer to record touch events occurring while running an application, as well as simulate touch events to be processed by an application running on the device. For example, on the remote machine 102 a technician can use a command line tool to send, over the USB connection 104, a command to the mobile device 100 to simulate a tap at coordinate (34, 49) on the screen of the device. In this scenario, the ADB command line tool simulates this tap on the mobile device and an application running on the device processes the tap as if the screen of the device were tapped at coordinates (34, 49) by a finger or a stylus. Using the ADB in this way has the disadvantage that the permissions are only given by the ADB when the physical security requirement is met, for example a wired connection of the device with a remote machine running the ADB. In the present technology, the problem is solved by sending and running on the device a heightened permission program, herein after "HPP", while the physical security requirement is met and the remote machine running the ADB is connected. While connected, the ADB gives permissions to the HPP to send and receive commands to or from other applications running on the device. The HPP maintains the heightened permission level of the ADB after the physical security requirement connection between the remote machine and the mobile device is disconnected.

The HPP, with the permissions granted thereto from the initial ADB physical security connection, can be utilized in both recording and replaying touch event sequences as will be describe below.

Figure 1B:
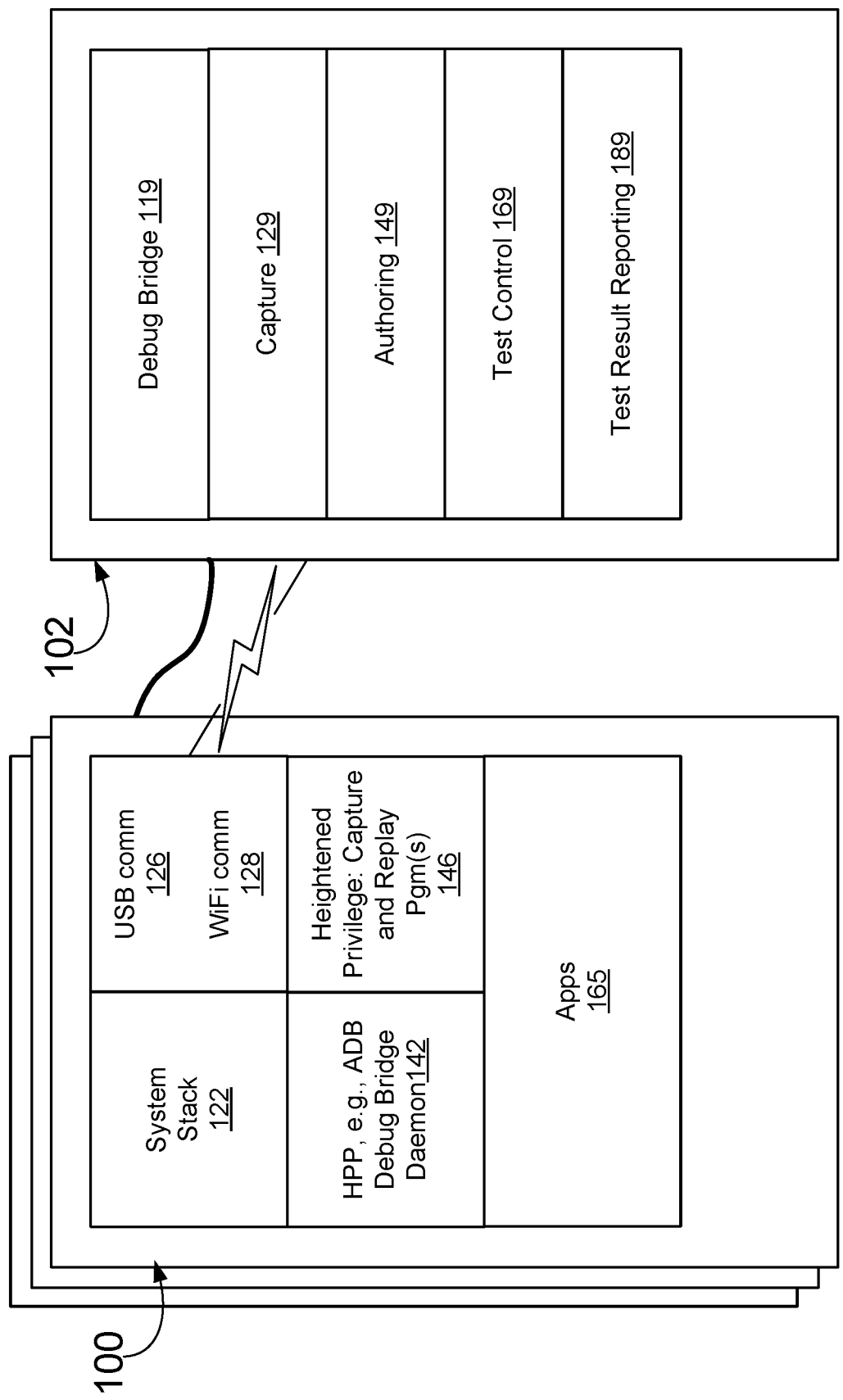
FIG. 1B is a high level software component block diagram of a mobile device under test and a test controller.

FIG. 1B is a high level software component block diagram of a mobile device under test 100 and a test controller 102. On the mobile device 100, a system stack 122, debug daemon 142 and apps 165 run. The system stack 122 provides low level functions, including system security and communications. The communications channels illustrated are USB communications 126 and WiFi communications 128. Of course, additional channels such as Bluetooth are likely to be present. Not illustrated is the system stack for the touch screen. The debug daemon 142, which communicates with the HPP on the mobile device, utilizes heightened permissions or privileges to generate or forward event data to other programs running on the mobile device, such as the system stack 122 or a screen capture program 146 or an application status interface, not illustrated. The daemon 142 also could communicate directly with the App 165, to obtain internal data. In one example, a test is performed by daemon interaction with the system stack, to generate touch events and to detect screen events resulting from the touches. The daemon also may interact with the system stack and/or the app to detect status changes in the system, either from events that change the system status or by watching variables or registers that reflect status. The debug daemon can receive data generated on the mobile device 100 and send it back to the ADB server or to a test console that interacts with or emulates the ADB server/client pair on the PC 102.

Both wired and wireless connections between the mobile device under test 100 and a test controller 102 are illustrated in FIG. 1B.

On the test controller 102, a debug bridge 119, capture program 129, authoring program 149, test control program 169 and test result reporting program 189 are illustrated. This organization of program parts is illustrative. In practice, fewer or additional modules can be used to implement the features described. In one example, the debug bridge 119 is the ADB host, which interacts with a special purpose HPP client 142, such as a daemon, running on the mobile device 100. The debug bridge transfers data, scripts, programs, etc. between the controller and the mobile device. The capture program 129 runs during capture of mobile device events that will be used during a test. Capture of screen touches with one and multiple figures are discussed in more detail below, as are captures of whole or partial screen images. Captured material may be revised using the authoring program 149, which is part of a development environment. Mistaken strokes can be eliminated and explicit conditions inserted by a test designer using the authoring program. The output of authoring can be a script or a compiled program that can run on the test controller 102 and pass messages to the mobile device 100 and/or a script or complied program that can run on the mobile device 100, responsive to commands from the test controller that initiate and control testing. The test control program 169 controls an actual test on the mobile device. It communicates with the HPP 142 running on the mobile device 100 to exchange data with the mobile device under test. The test result reporting program 189 receives and formats for display data from one or more tests. In one example, the test reporting program formats HTML pages that are displayable in a browser or an app client that has rendering capabilities.

Recording and Authoring

Figure 2:
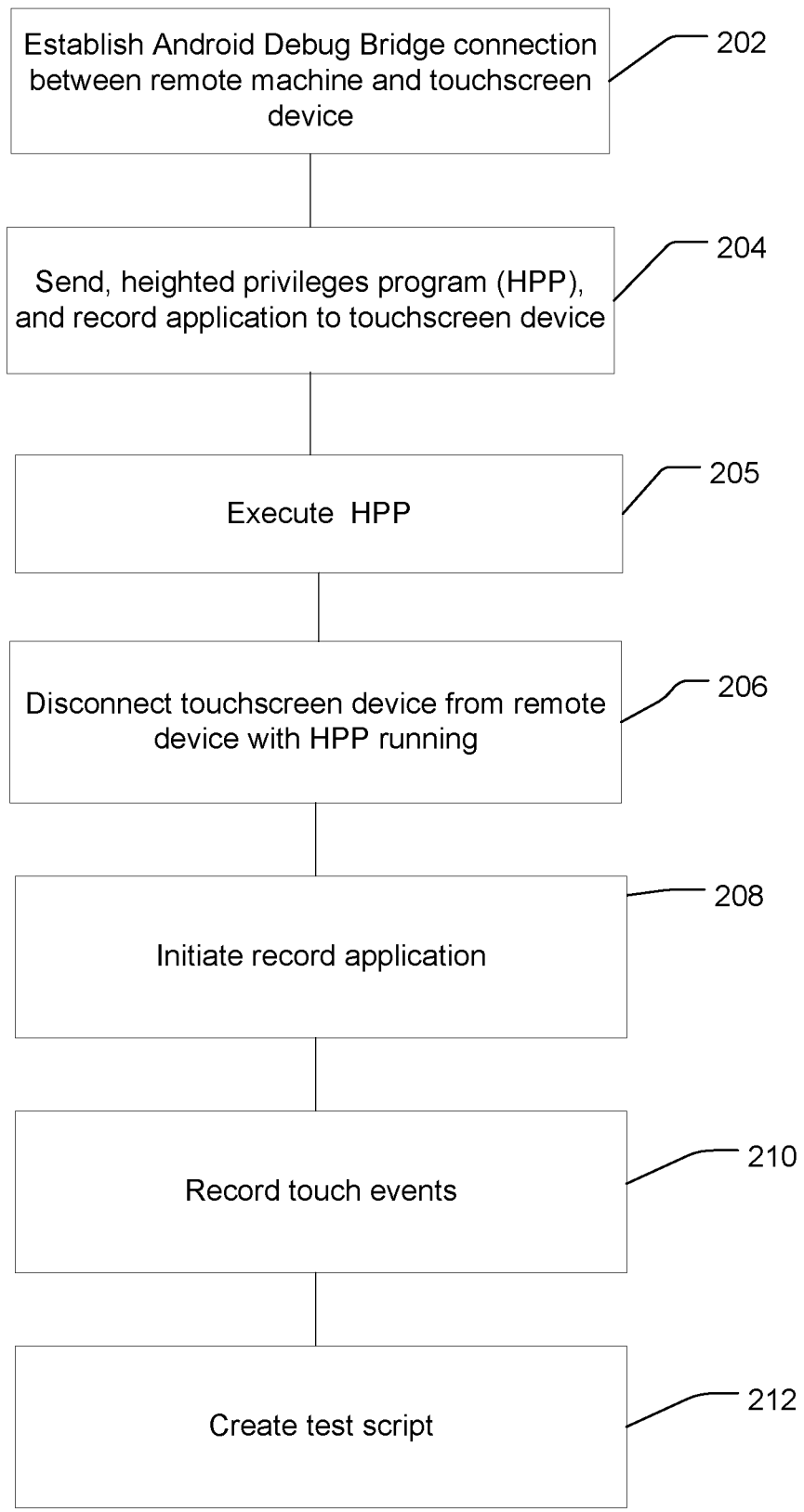
FIG. 2 is a flow chart of creating a test script.

FIG. 2 shows a flow chart showing an example method for recording a sequence of touchscreen events to create a test script. Screen events also can be collected. As discussed above, the initial step 202 includes establishing a connection between the touchscreen device and the remote machine to establish a debugging link and enables a HPP on the mobile device.

In the next step 204, over the connection a HPP as well as a recording application for recording touch events are sent from the remote machine to the touchscreen device. This step does not need to be repeated for multiple sessions, as the touchscreen device can store programs once loaded. From either with the device or the remote machine, the HPP is caused to run on the mobile device 205. The record application is configured to record touch events on the mobile device. Alternatively, events on the touchscreen device could be reported immediately back to the remote machine or test controller, instead of being recorded in memory of the mobile device.

In this example, the debugging link is established using ADB. The connection may be through USB or initially through USB followed by WiFi. Other tools than ADB or future implementations of ADB may allow the connection to be made initially over WiFi, Bluetooth or another wireless channel. Using ADB, a physical security requirement is satisfied by the USB connection.

In a debugging session, elevated permissions are given which allow an HPP application on the mobile device to generate simulated events, such as system touch events normally generated by the stack in response to contact with a touch sensitive display. In another example, system gesture events can be simulated, as if an optical sensor on the mobile device were detecting a control gesture in view of the optical sensor. The event simulation script can run either on the test console in communication with the mobile device or in one or more programs on the mobile device. For instance, the HPP could run the script or another application on the mobile device could run the script and communicate events to the HPP for relay.

With the HPP running on the mobile device and the initial physical security requirement satisfied, the USB connection between the mobile device and the remote machine is disconnected 206. A wireless connection is established to permit control and data exchange during and after a test. While this example describes a single device, this process of initiating a HPP and disconnecting a device with the HPP running can be performed on a plurality of devices, either in unison or sequentially. This capability is used primarily during playback, but also could be used during recording to collect sequences of touch events from multiple devices. Following reconnection, a technician initiates the record application 208. The record application is configured to utilize the heightened permissions enabled by the HPP. The heightened permissions allow the record application to run in a background mode and record a sequence of touch events 210, performed by the technician, that are processed by one or more applications running on the mobile device. After the technician completes recording a test sequence, the recorded touch events are used and can be edited during authoring to create a test script 212 that can be used to replay the touch events on the same or different device.

While the discussion above refers to touch events, the system also could record gesture events or spoken events as control inputs. Replay of control inputs, generally, can be performed during testing.

Figure 3C:
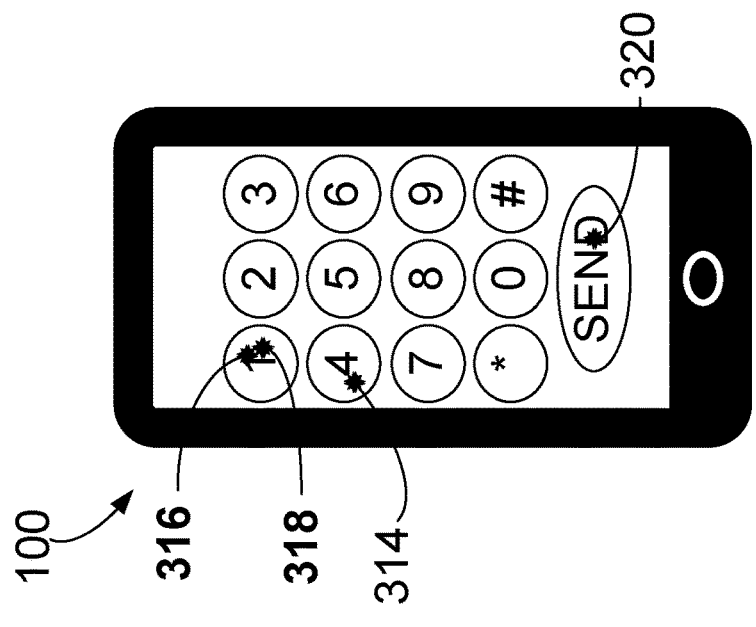
FIGS. 3A-C is a sequence of images illustrating a recorded and replayed sequence of touch events.
Figure 3B:
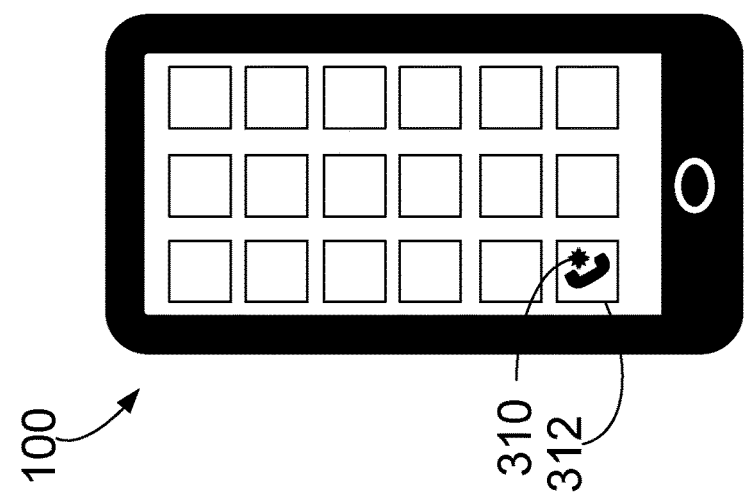
Figure 3A:
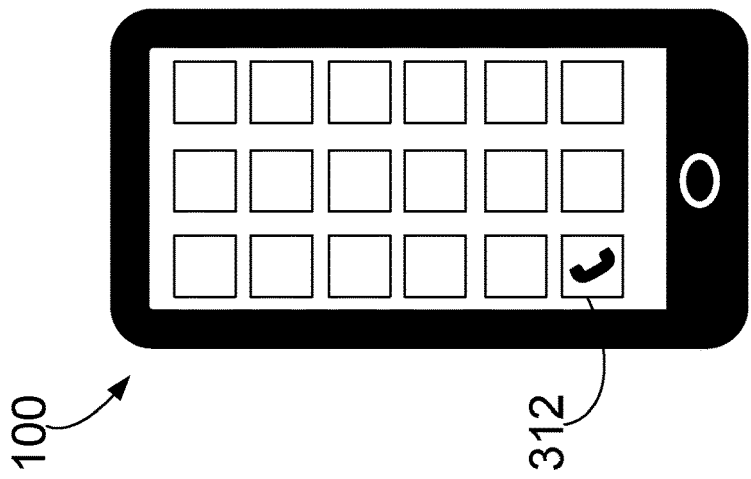

FIGS. 3A-C show an example of a sequence of touch events performed by a technician and recorded by a record application. In these figures, taps are illustrated with a star shape. In the example, the technician performs a sequence of touch events to place a call, specifically a call to the number "411", to reach directory assistance. As shown in FIG. 3A, when recording is initiated the screen of the device initially includes an icon 312 for initiating the telephone function of the device 100. As shown in FIG. 3B, the technician makes a first tap 310 of the touchscreen at a location overlapping the icon 312 for opening the telephone function. The coordinates and a timestamp of the first tap 312 are recorded by the record application. The first tap 312 is processed by the operating system of the device as a tap on the telephone icon, and the device initiates the telephone function of the device and renders a virtual telephone number pad, as is shown in FIG. 3C. Using the virtual telephone number pad, the technician makes a tap 314 on the "4 key", followed by two taps 316 and 318 on the "1 key", followed by a tap 320 on the "send key". Coordinates and a timestamp are recorded for each tap performed by the technician. In embodiments, the saved timestamps for each touch event may include one or more of; the actual time of the touch event, a difference in time between consecutive touch events, or a time relative to the initiation of the test or an initial touch event. The saved coordinates can be stored as absolute positions on the screen of the device or relative positions within a window (for larger and multi-window devices).

Corresponding to FIGS. 3A-C, the following is an example of information included in a recorded sequence of touch events. In this example, the first coordinate is a pixel column and the second a pixel row, with the origin in the bottom left corner of the display. The coordinate system is selected for illustrative purposes, not based on any particular touchscreen.

1: Tap (100, 120); time 0:00.00
2: Tap (80, 426); time 0:01.50
3: Tap (118, 563); time 0:02.25
4: Tap (123, 560); time 0:02.45
5: Tap (310, 100); time 0:02.80

As shown, the information may include the type of touch event, the coordinates, and a timestamp.

In the example described in relation to FIGS. 3A-C, the recorded touch events are "taps". Other types of touch events and parameters for touch events may be recorded and used in creating a test script, which may be replayed to simulate the touch events on another device. For example, the touch event may include data for a combination of one or more fingers, styluses, or any other pointing means. Further, in addition to taps, the recorded touch event may include touch duration, pressure, area, or a path of a touch including gestures such as a drag, swipe, or pinch. Further, touches which overlap in time may be recorded as a single or multiple touch events. Additionally, in embodiments, hardware button inputs of the device may also be recorded and later simulated during playback of the test script created from the recording. As mentioned above, gesture events and spoken events, as other types of control input, also could be recorded for later simulation of control input during a test. In the example illustrated in FIGS. 3A-C, the timing of touch events can be used directly or edited in a test script. Timestamps of the recorded touch events can be use directly or modified. Techniques for splicing audio/video can be applied to timing edits.

Conditions of the device before or between recorded touch events may be recorded and used to create conditional statements in the test script during authoring. The recording app can record the condition of the device while the technician is touching the display or during playback of a recorded sequence of touch events, such as the screen appearance. Conditional statements added to a test script during authoring can be used during replay of the test script to control the timing of replay. Synchronizing touch events with screen appearance events can ensure that the applications running on the device are in a state ready to receive and process the touch events in the sequence.

FIGS. 4A-C, illustrate an example of using a record application to record touch events and screen conditions which will be used to create a conditional statement in the test script created from the recording. In the example, a technician records a touch event to be used in a test script for answering an incoming telephone call. The exact timing of the call to the device may be difficult to coordinate with the initiation of the test. For example, if the test script includes an instruction for simulating a tap on the screen, at the location of an answer button of an incoming call window, 10 seconds after initiating the test and the incoming call is delayed and occurs 15 seconds after the initiation of the test then the simulated tap would occur prior to the phone application on the device being ready to receive the input with the incoming call window being rendered on the screen to be interacted with. Therefore, in this example with a delayed incoming call the simulated tap would not answer the call as intended. To solve this problem, as noted above the present technology allows for the record application to record device conditions, such as screen conditions, which are used to create conditional statements in the test script.

In the example shown in FIGS. 4A-C, the recording is initiated with the record application, and initially device 100 is not displaying an incoming call window. In the example the device is initially displaying a desktop with icons for a plurality of apps, as shown in FIG. 4A, and therefore the device is not ready to receive a touch input to answer an incoming call. As shown in FIG. 4B, the device 100 receives an incoming call over a cellular or WiFi network and an incoming call window 402 appears which occupies a portion of the touchscreen display. The recording application includes a feature allowing the technician to record the entire screen or a portion of the screen as a device condition, referred to as a screen condition, which indicates that one or more applications running on the device are ready to receive the input which the technician will perform after recording the device condition. In the example, the application records the device screen, which includes the incoming call window 402, as a screen condition. All changes in screen condition can be recorded automatically during a recording session and selected during authoring for use in script conditional statements.

Following the recording of the screen condition, the technician taps 404 the "answer button" of the incoming call window 402, to answer the incoming call. In this example the screen condition of the incoming call window with a timestamp are recorded, followed by recording coordinates and a timestamp for the tap location on the screen corresponding to the answer button. As will be discussed below, during replay of a test script authored from a recording, the replay can monitor the display of the device in order to detect the screen appearance that is included in conditional statement. Once the incoming call window is detected and the condition of the conditional statement satisfied, the device is ready to receive and process the next touch event, and test sequence continues according to the timing of the touch event sequence in the script, relative to the conditional statement being met.

A test script may include a plurality of conditional statements that control the timing of different portions of the sequence of touch events. For example, adding to the example of FIGS. 4A-C, after answering the first call the technician may record additional touch events which answer a second call received during the first call. In this example, the technician may record the incoming call window of the second call as a screen condition to be used to create a second conditional statement in the test script for use in determining the timing of touch events which answer the second call.

While the above examples describe using screen conditions to create conditional statements, other device conditions may be recorded as part of a test sequence and used in creating conditional statements which are used to determine that applications running on the device are in a ready state to receive and process touch events. In embodiments, the device conditions include; status of a headphone jack, Bluetooth connection to a device such as a headset, gyroscope measurements, GPS measurements, battery level, temperature, packet stream size or content, processor load and other device sensor conditions. Further, in embodiments a conditional statement may include one or more device conditions to be met before subsequent touch events are simulated. Similarly, gesture and spoken input control events also can be recorded and incorporated in test scripts.

Replaying a Test Script

Figure 5:
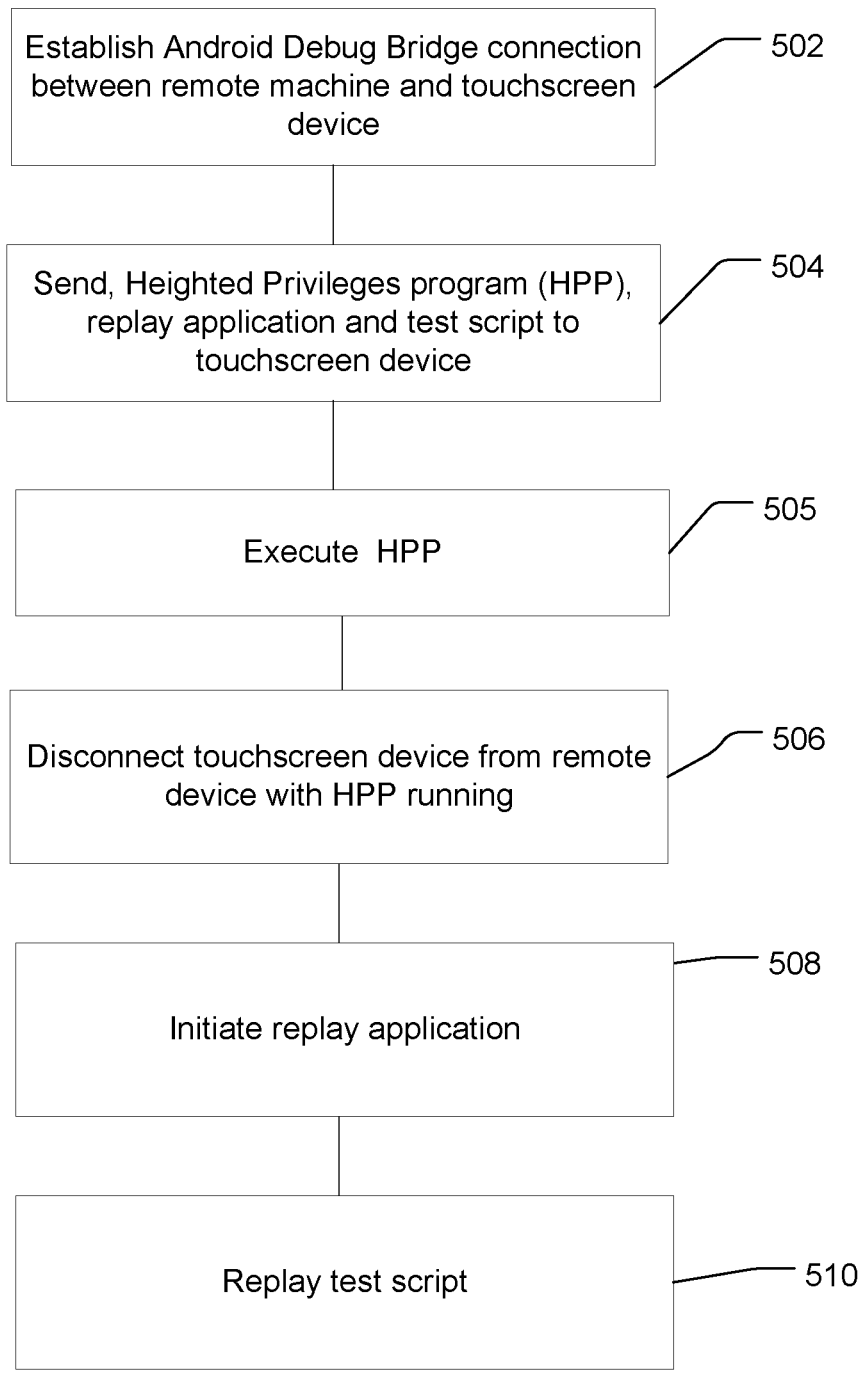
FIG. 5 is a flow chart of replaying test script.

FIG. 5 shows a flow chart for (re)playing a test script including a sequence of touch events or other control input events. Similar to FIG. 2 discussed above, the initial step 502 of replaying a test script with a replay application includes establishing a connection between the touchscreen device and the remote machine, wherein both the machine and device are configured to run a command line tool, in this example the ADB. The connection may be through USB or initially through USB and then through WiFi. With the connection a physical security requirement is met and permissions are given which allow applications on the touchscreen device to send and receive commands from one another. In the next step 504, over the connection a HPP, a replay tool and a test script are sent from the remote machine to the device. Either with the device or the remote machine, the HPP is caused to run on the mobile device 505. The replay application is configured to replay touch events on the mobile device.

With the HPP running on the mobile device, the ADB session is disconnected 506 and the USB connection unplugged. The remote machine acting as a test controller 102 reconnects to the touchscreen device via a wireless connection. While this example describes a single device, this process can be performed on a plurality of devices, either in unison or sequentially, so that a plurality of devices are configured to replay sequences of touch events according to a test script. Following reconnection, a technician initiates the replay application 508. The replay application is configured to utilize the heightened permissions enabled by the HPP. The heightened permissions allow the replay application to run in a background mode and replay a sequence of touch events 510, according to the test script. The touch events are processed by one or more applications running on the mobile device. As discussed above, a replay test script may be authored from a technician's recording of touch events. Additionally, test scripts created in various other ways can be used by the replay application.

In embodiments, the replay application allows a technician to initiate replay of a test script or to initiate replay of a test script after a predetermined time. Further, the replay application allows for a technician to remotely initiate a test script.

As described above, a test script may include a plurality of touch events with timestamps. In embodiments, when the test script is replayed the first touch event is simulated on the device under test, and the second touch event is simulated next with a time delay between the two events corresponding to the timestamps of the two events. As discussed above, in embodiments, the timestamps in the test script corresponding to an event may be relative to previous touch events, the initiation of the recording, or a conditional statement.

The sequence shown in FIGS. 3A-C will be used again to describe replay of a test script with a replay application. During replay, the test script is initiated and the screen of the device initially includes an icon 312 for opening the telephone function of the device, as is shown in FIG. 3A. According to the test script, a first tap 310 of the touchscreen is simulated at the coordinates, and at a time according to the touch event in the test script. As shown in FIG. 3B, the first tap 310 overlaps the icon 312 for opening the telephone function, and the device 100 process the first tap 310 to initiate the telephone function of the device which results in the display of a telephone number pad as is shown in FIG. 3C. Taps 314 316 318 and 320 are next simulated sequentially according to the timestamps of the touch events in the test script. This sequence of taps results in the device placing a call to "411". As noted above, this example sequence of touch events is performed based on the timestamps of the touch events, and the test script does not include conditional statements which may be used for the timing of the touch events.

As described above, the example shown in FIGS. 4A-C includes a test script including conditional statements used to determine the timing of replay of the touch event sequence in the test script. The sequence shown in FIGS. 4A-C will be used again to describe replay of a test script including conditional statements. The test script includes a conditional statement, including a screen condition, which requires a portion of the screen to display an incoming call window prior to initiating replay of a sequence of touch events. The test script is initiated and the screen of the device 100 is monitored by the replay application for the screen condition of the test script to be met. As shown in FIG. 4A, the screen displays a desktop, including icons, for applications and does not include the incoming call window and therefore the conditional statement is not met. As shown in FIG. 4B, the device receives an incoming call and the incoming call window appears on the display. The replay application monitoring the display of the device detects a screen condition on the device as matching the screen condition of the conditional statement and initiates a sequence of touch events of the test script which follow the conditional statement.

In this example, the test script includes a tap 404 to be simulated at coordinates on the screen of the device corresponding to the "answer key" of the incoming call window 402. The simulated tap is processed and the incoming call is answered. As noted above, in this example if a conditional statement were not used and only timestamps were used then if the incoming call is delayed the simulated tap may register on the icon displayed on the screen prior to the incoming call window being displayed.

The examples shown, including automating telephone functions, are intended to be non-limiting examples of possible automation of the device using the replay application to run test scripts created using a record application. In embodiments, the test script may be used to simulate touch events that are processed by any application running on the device. For example, the test script may be used to simulate browsing the internet, playing a streaming video, downloading and/or installing an application, or any other function that the technician may perform on the device using the touchscreen and physical buttons.

Further, in the examples above the conditional statements are based on screen conditions associated with the phone function, however in embodiments, features of any application may be used to create conditional statements. For example, a technician may record a test script including opening an internet browser to access a webpage of a search engine and perform a search using the search engine. The device's connection to the internet during recording may be different than during replay and this difference in connection may have an effect on the timing of loading a page. Therefore, a test script without conditional statements, like in the example shown in FIGS. 3A-C, may not work because touch events intended to be performed after the webpage loads may be performed prior to the webpage loading, and therefore the desired order of operations of the test would not be performed. Accordingly, in this example, a screen condition of the webpage may be recorded and included in the test script as part of a conditional statement.

Testing Parameters

During the replay of the test script with the replay application, various device performance parameters may be monitored and recorded, for example voice quality, data throughput, video quality, batter life, current draw or call performance. In embodiments, the monitoring may be performed with the replay application or with a separate application. In embodiments, screen shots of the device may be recorded during replay of the test script which may be analyzed to determine the state of a condition of the device, for example the battery level or connection strength based on icons displayed on the devices home screen.

In embodiments, during replay of a test script, the device may execute code that captures information about the device, for example wireless network information or the location of the device. Parameters such as; latitude and longitude, signal strength, signal quality, serving channel and channel type, serving cell, or WiFi network, may also be recorded. In embodiments, measurements collected corresponding to current draw may be analyzed for correlation device conditions such as wireless network conditions and battery temperature.

Computer System

Figure 6:
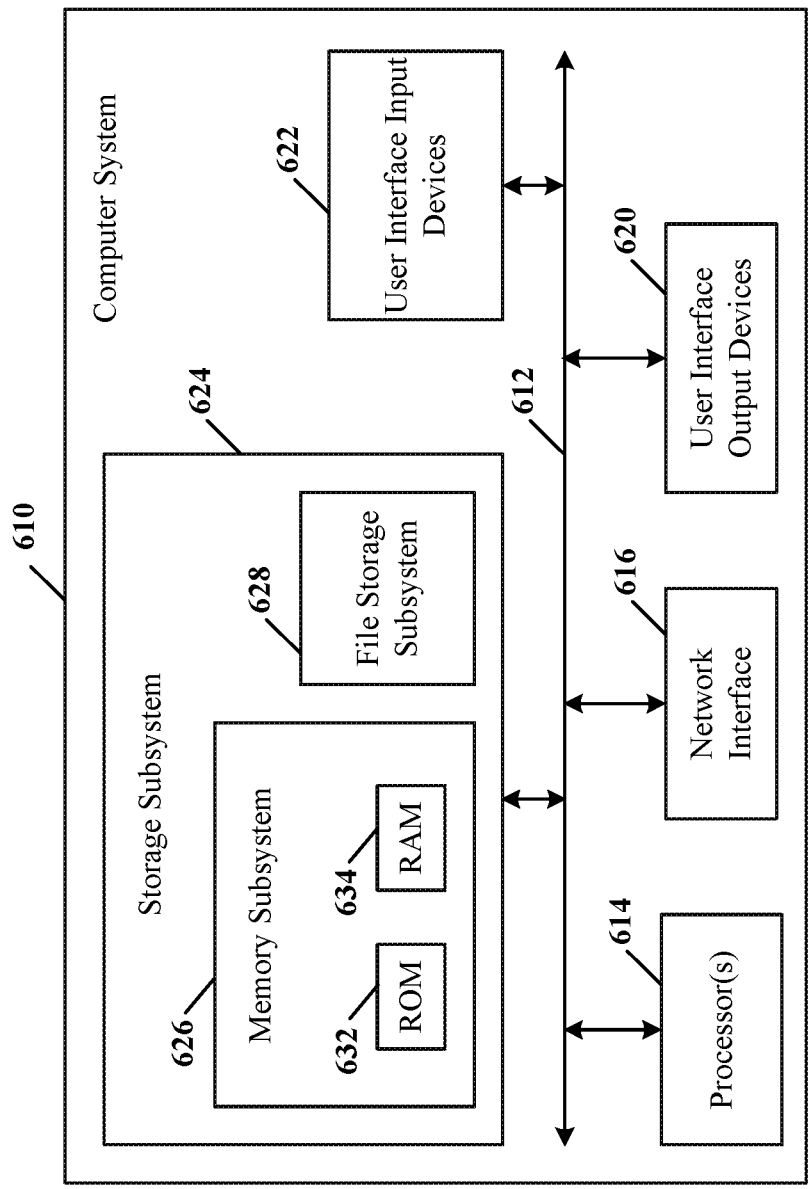
FIG. 6 is a block diagram of an example computer system

FIG. 6 is a block diagram of an example computer system, according to one implementation. Computer system 610 typically includes at least one processor 614 that communicates with a number of peripheral devices via bus subsystem 612. These peripheral devices may include a storage subsystem 624 including, for example, memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to corresponding interface devices in other computer systems.

User interface input devices 622 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 614 alone or in combination with other processors.

Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In one implementation, a method is described from the perspective of running a test. The method includes, on a plurality of devices, initiating on each device a debugging mode that enables a heightened privilege process to run in a background mode on the devices. The heightened privilege process allowing simulation of control input events, including screen touch events. The control input events will be processed by other applications running on the device. Practically speaking, the debugging mode can conveniently be initiated using a single USB cable with one of the devices of the time, because they can be disconnected and reconnected using a wireless protocol. When multiple USB cables are used, one per device, the disconnection and reconnection can be avoided.

The method further includes loading a replay application on the plurality of devices. This replay program can be the heightened privilege process or another process operating in communication with the heightened privilege process. The method also includes running at least one test script that includes control input events. In some implementations, the test script includes and one or more conditional statements used to control timing of replay of the control events. In response to the test script, the replay application generates a sequence of simulated control events. In some implementations, the method also includes collecting performance measurements indicating response of the touchscreen devices to the replayed sequence of simulated control events. The data can be collected on the touchscreen devices during the test and relayed after the test. Alternatively, the heightened privilege process can relay data to a remote, test controller as the test script runs.

The method described also can be viewed from either the perspective of the test controller, alone, or one of the touchscreen devices. From the perspective the test controller, the method includes providing a heightened privilege process for installation on the touchscreen device, engaging in handshake to initiated debugging session, using a script because generation of simulated system events on the touchscreen device and controlling the test based on the simulated system events. The method can further include collecting test results. Any aspects of the preceding method view from the combined perspective of the test controller and the touchscreen devices can be recast from the perspective of test controller.

From the perspective of the touchscreen device, the method includes receiving a heightened privilege process, installing the process, engaging in a handshake to initiated debugging session, responsive to the script, generating simulated system events for processing by applications running on the touchscreen device, responsive to control instructions from the test controller. The method can further include collecting test results and forwarding the test results to the test controller.

This method in other implementations of the technology disclosed can include one or more of the following features and/or features described in connection with additional methods disclosed. In the interest of conciseness, the combinations of features disclosed in this application are not individually enumerated and are not repeated with each base that of features. The reader will understand how features identified in this section can readily be combined with sets of these features identified as implementations, such as recording and replaying a test script, whether from the perspective of the test controller, the touchscreen device, or both devices.

The method can be practiced by initiating the debugging mode using a wired USB connection with the touchscreen devices. Then, disconnecting from debugging mode sessions and unplugging the wired USB connection while the heightened privilege processes remaining running on the touchscreen devices. Followed by, reconnecting to the touchscreen devices via a wireless communication channel and utilizing the running heightened privilege process to generate the sequence of simulated control events in the test script.

The debugging mode can be implemented using components of a version of Android Debug Bridge. Several related debugging programs available for the Android environment could be substituted for ADB.

The conditional statements can include detecting a device screen condition matching a recorded screen condition referenced in the test script. Running the test script can include simulating a control input event from the sequence of control events in response to detecting a matching device screen condition. According this feature, the screen condition can include a graphic displayed on a device display indicating an incoming call or indicating a conference call. The graphic displayed can indicate a particular state of the task other than calling.

Playing the recorded sequence can include detecting a sensor condition matching a recorded sensor condition referenced in the test script, and simulating a control input event from the sequence of control events in response to detecting the matching sensor condition.

The method can further include monitoring the touchscreen devices during playing the recorded sequence to measure one or more quality of service parameters.

Playing the recorded sequence can cause the touchscreen device to execute one or more of launching an application, typing text, placing a call, or answering a call. It can cause the touchscreen device to execute one or more of browsing the web, playing an audio file or playing a video file. Any combination of these enumerated operations is hereby disclosed.

In a complementary implementation, the method is described to create a test sequence for touchscreen devices. This method includes, on a touchscreen device coupled in communication with a remote debugger device, initiating a debugging mode that enables a heightened privilege process to run in a background mode on the touchscreen device. The heightened privilege process allows access to and recording of screen touch events that are directed to other applications running on the device. For instance, the system stack can provide a copy of system events to the heightened privilege process or can insert the heightened privilege process in a distribution chain ahead of processes that will consume the events. The method further includes loading a record application on the device, running the record application and recording a sequence of control input events. The events recorded can include touch screen events, with event timing data. Control input events are events that will be processed by other applications running on the device. The method further includes recording one or more other system events. Recorded events include at least one screen display condition. Events are recorded with timing data. In some implementations, the method includes providing the recorded control input events and other system events to a further application as input to authoring a test script. Or, it can include persisting to tangible computer readable media the recorded events.

As above, the test sequence creation method described also can be viewed from either the perspective of the test controller, alone, or the touchscreen device and the test controller is a system. From the perspective the test controller, the method includes providing a heightened privilege process for installation on the touchscreen device, engaging in handshake to initiated debugging session, using a script to cause generation of simulated system events on the touchscreen device and controlling the test based on the simulated system events. The method can further include collecting test results. Restated from the perspective of a system, operations on both test controller and touchscreen device can be described.

This method in other implementations of the technology disclosed can include one or more of the following features and/or features described in connection with additional methods disclosed. The method further include initiating the debugging mode using a wired USB connection with the touchscreen device; disconnecting from debugging mode sessions and unplugging the wired USB connection while the heightened privilege processes remaining running on the touchscreen devices. It can include reconnecting to the touchscreen devices via a wireless communication channel and utilizing the running heightened privilege process to initiate the recording of the system events. The debugging mode can be implemented using components of a version of Android Debug Bridge.

The method can further include combining conditional statements with one or more recorded other system events in a test script to control timing of replay of the control events, and storing the test script to be replayed in a test. Or, the test script can be provided to a replay or other test process. The screen condition can include a graphic displayed on the touchscreen device indicating an incoming call, or any of the variations described above.

Recording the test sequence can include recording a device sensor condition, to be used in a conditional statement.

The method can further include distributing the recorded test sequence to a plurality of touchscreen devices configurable to execute the test sequence to simulate the control input events in the test script. Then, concurrently using the test script with the plurality of touchscreen devices to run a test. In some implementations yet further includes collecting performance measurements from the test indicating response of the touchscreen devices to the simulated events in the test script. It also can include collecting quality of service parameters or device performance parameters during the simulation of the sequence of events.

Each of the method implementations described from the perspective of a test controller can be practiced as a device. The device includes a processor and tangible memory coupled to the processor. Instructions loaded into the memory, when executed, cause the processor to carry out the actions described above for a test controller method. These actions can include recording data for a script, authoring a script from recorded data, and/or using the script to cause generation of simulated events on devices under test. It also can carry out actions related to collecting test data and results from tests.

Each of the method implementations also can be described from the perspective of the touchscreen device instrumented for one aspect or another of testing. The touchscreen device includes a processor and tangible memory coupled to the processor. Instructions loaded into the memory, when executed, cause the processor carry out the actions described above for a touchscreen device. These actions include recording data for the script, authoring a script from recorded data, and/or generating simulated events responsive to the script. It also can carry out actions related to collecting test data and results from tests.

Computer readable storage media implementations are also disclosed. Examples of tangible storage media are dynamic random access memory, nonvolatile solid-state memory and rotating memory. Tangible storage media are not intended to include transitory waveforms, whether in free space or on a wire or trace. While the technology disclosed could be practiced as software per se or as software conveyed by a transitory waveforms, neither tangible storage media nor tangible computer readable storage media are intended to extend to transitory waveforms.

The technology disclosed can be practiced as a tangible computer readable storage media impressed with instructions that, when executed on appropriate hardware, causes the hardware to carry out any of the methods described above. Alternatively, it can be practiced as a tangible computer readable media impressed with program instructions that, when combined with appropriate hardware, produces any of the devices described above.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

The invention claimed is:

1. A method of testing touchscreen devices, comprising:
   accessing at least one test script comprising a recorded sequence of control input events and recorded timing between the control input events, modified at least by inserting a conditional statement between successive control input events in place of the recorded timing between a pair of the successive control input events, wherein the conditional statement delays execution of a later control input event in the pair until detection of a display event that produces a display that matches a previously captured display generated by the sequence of control input events;
   on a plurality of devices, initiating on each device a debugging mode that enables a heightened privilege process to run in a background mode on the devices, the heightened privilege process allowing simulation of control input events, including screen touch events, which control input events will be processed by other applications running on the device;
   loading a replay application on the plurality of devices;
   running the test script using the replay application, simulating an earlier input control event in the pair, executing the conditional statement used to control timing of the replay of later control input events, and responsive to detection of at least one display event producing a display that matches the previously captured display, simulating the later control event in the pair at a time determined by the conditional statement in the test script; and collecting performance measurements indicating response of the touchscreen devices to the sequence of simulated control events.

2. The method of claim 1, further including:

initiating the debugging mode using a wired USB connection with the touchscreen devices;

disconnecting from debugging mode sessions and unplugging the wired USB connection while the heightened privilege processes remaining running on the touchscreen devices; and reconnecting to the touchscreen devices via a wireless communication channel and utilizing the running heightened privilege process to generate the sequence of simulated control events in the test script.

3. The method of claim 1, wherein the debugging mode is implemented using components of a version of Android Debug Bridge.

4. The method of claim 1, wherein the conditional statements include detecting a device screen condition matching a recorded screen condition referenced in the test script, and simulating a control input event from the sequence of control input events in response to detecting the matching device screen condition.

5. The method of claim 4, wherein the screen condition includes a graphic displayed on a device display indicating an incoming call.

6. The method of claim 1, further including, when running the test script, detecting a sensor condition matching a recorded sensor condition referenced in the test script, and simulating a control input event from the sequence of control input events in response to detecting the matching sensor condition.

7. The method of claim 1, further comprising monitoring the touchscreen devices during running the test script to measure one or more quality of service parameters.

8. The method of claim 1, wherein running the test script causes the touchscreen device to execute one or more of launching an application, typing text, placing a call, or answering a call.

9. The method of claim 1, wherein running the test script causes the touchscreen device to execute one or more of web browsing, playing an audio file or playing a video file.

10. A method to create a test sequence for touchscreen devices, comprising:

on a touchscreen device coupled in communication with a remote debugger device, initiating a debugging mode that enables a heightened privilege process to run in a background mode on the touchscreen device, the heightened privilege process allowing access to and recording of screen touch events that are directed to other applications running on the device;

loading a record application on the device;

running the record application and recording a sequence of control input events, including touch screen events, with event timing data, which control input events will be processed by other applications running on the device;

further recording one or more other system events, including at least one screen display condition, with display condition timing data;

adding to a test script based on the recorded control input events a conditional statement that replaces event timing between a pair of successive control input events, which conditional statement uses matching of the screen display condition to control timing of replay of the control events initiating simulation of control input events happening after satisfaction of the conditional statement, without dependence on a time at which the screen display condition was recorded;

storing the test script to be replayed in a test; and causing the test script to be executed on a mobile device under test.

11. The method of claim 10, further including:

initiating the debugging mode using a wired USB connection with the touchscreen device;

disconnecting from debugging mode sessions and unplugging the wired USB connection while the heightened privilege processes remaining running on the touchscreen devices; and reconnecting to the touchscreen devices via a wireless communication channel and utilizing the running heightened privilege process to initiate the recording of the system events.

12. The method of claim 10, wherein the debugging mode is implemented using components of a version of Android Debug Bridge.

13. The method of claim 10, wherein the screen condition includes a graphic displayed on the touchscreen device indicating an incoming call.

14. The method of claim 10, wherein recording the test sequence includes recording a device sensor condition, to be used in a conditional statement, prior to recording at least one touch event.

15. The method of claim 10, further including:

distributing the test script to a plurality of touchscreen devices configurable to execute the test sequence to simulate the control input events in the test script;

concurrently using the test script with the plurality of touchscreen devices to run a test; and collecting performance measurements from the test indicating response of the touchscreen devices to the simulated events in the test script.

16. The method of claim 15, collecting quality of service parameters or device performance parameters responsive to the simulated events in the test script.

\* \* \* \* \*